(12) United States Patent
Amin et al.

(10) Patent No.: US 8,298,611 B2
(45) Date of Patent: Oct. 30, 2012

(54) DISCRETE TRACK MEDIA

(75) Inventors: Nurul Amin, Woodbury, MN (US); Sining Mao, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 853 days.

(21) Appl. No.: 12/178,443

(22) Filed: Jul. 23, 2008

(65) Prior Publication Data

US 2010/0021767 A1 Jan. 28, 2010

(51) Int. Cl.
*G11B 5/00* (2006.01)
(52) U.S. Cl. .......... 427/128; 427/127; 427/132
(58) Field of Classification Search ........... 427/128, 427/127, 132
See application file for complete search history.

(56) References Cited

U.S. PATENT DOCUMENTS

| | | | | |
|---|---|---|---|---|
| 3,400,328 A | * | 9/1968 | Penn et al. | 324/247 |
| 4,410,603 A | * | 10/1983 | Yamamori et al. | 428/611 |
| 5,062,021 A | | 10/1991 | Ranjan et al. | |
| 5,066,552 A | * | 11/1991 | Howard et al. | 428/836.2 |
| 5,093,192 A | * | 3/1992 | Kawahara et al. | 428/323 |
| 5,108,781 A | | 4/1992 | Ranjan et al. | |
| 5,815,342 A | * | 9/1998 | Akiyama et al. | 360/97.01 |
| 6,109,175 A | * | 8/2000 | Kinoshita | 101/170 |
| 6,139,936 A | | 10/2000 | Weiss | |
| 2006/0131270 A1 | * | 6/2006 | Sewell | 216/67 |

OTHER PUBLICATIONS

S.E. Lambert et al. Beyond Discrete Tracks: Other Aspects of Patterned Media, Journal of Applied Physics, vol. 69, 8:4724-26, Apr. 15, 1991.

* cited by examiner

*Primary Examiner* — Timothy Meeks
*Assistant Examiner* — Mandy Louie
(74) *Attorney, Agent, or Firm* — Hollingsworth Davis, LLC

(57) ABSTRACT

A method of fabricating a discrete track magnetic recording media. A base layer is provided onto which repeating and alternating magnetic layer and non-magnetic layers are deposited. The thickness of the magnetic layer corresponds to the width of the track of the recording media. A cylindrical rod can be used as the base layer, such that the alternating magnetic and non-magnetic layers spiraling or concentric layers around the rod. The resulting media layer can be cut or sliced into individual magnetic media or used to imprint other media discs with the discrete pattern of the media layer.

8 Claims, 8 Drawing Sheets

DISCRETE TRACK MEDIA

BACKGROUND OF THE INVENTION

Thin film magnetic recording disks generally comprise a disk substrate having a magnetic layer and a number of underlayers and overlayers deposited thereon. The nature and composition of each layer is selected to provide desired magnetic recording characteristics, as generally recognized in the industry. An exemplary present day thin film disk comprises a non-magnetic disk substrate, typically composed of an aluminum alloy. An amorphous nickel phosphorous (Ni—P) underlayer is formed over each surface of the disk substrate, typically by plating and is subsequently polished and sometimes texturized prior to deposition of the additional films. The Ni—P layer is hard, and imparts rigidity to the aluminum substrate. Alternatively, glass and other non-metallic materials are now used to form highly rigid disk substrates. A second underlayer in the form of a chromium ground layer is formed over the Ni—P layer, typically by sputtering, and a magnetic layer is formed over the ground layer. The magnetic layer comprises a thin film of ferromagnetic material, such as a magnetic oxide or magnetic metal alloy. Usually, a protective layer, such as a carbon film, is formed over the magnetic layer and a lubricating layer is formed over the protective layer.

The presence of the Ni—P underlayer, together with the chromium ground layer, has been found to improve the recording characteristics of the magnetic layer. In particular, the chromium ground layer formed over a Ni—P layer provides enhanced coercivity and reduced noise characteristics. Such improvements are sometimes further enhanced when the Ni—P underlayer is treated by mechanical texturing to create a roughened surface prior to formation of the chromium ground layer. The texturing may be circumferential or crosswise, with the preferred geometry depending on the particular composition of the cobalt-containing magnetic layer.

The outer carbon protective layer serves a very different purpose. This protective layer has been found to greatly extend the life of magnetic recording media by reducing disk wear. Carbon has been shown to provide a high degree of wear protection when a thin lubrication layer is subsequently, applied.

Such magnetic recording disk constructions have been very successful and allow for high recording densities. As with all successes, however, it is presently desired to provide magnetic recording disks having even higher recording densities. One method for increasing the areal density on rigid magnetic disks involves patterning the surface of a thin film disk to form discrete data tracks. Such "discrete track media" typically include surface geometry data which are utilized by the hard disk drive servo mechanism, allowing specific recording tracks to be identified, and providing feedback to improve the accuracy of read/write head tracking.

The production of discrete track media and other magnetic recording media having patterned surfaces were described by S. E. Lambert et al. in Beyond Discrete Tracks: Other Aspects of Patterned Media, JOURNAL OF APPLIED PHYSICS, Vol. 69, 8:4724-26, Apr. 15, 1991. Each of the patterned media described were produced by sputter etching or ion milling a magnetic recording layer through a resist mask. The resist mask was written with an electron beam, as is known in the lithographic arts.

The production of discrete track media with a pre-embossed rigid magnetic disk was described by D. Dericotte, et al., in Advancements in the Development of Plastic Hard Disks With Pre-embossed Servo Patterns, CORPORATE RESEARCH LABORATORIES, SONY CORPORATION. The disk is produced using an injection molding process between two stamping plates. The plates containing the media surface pattern are produced using lithographical techniques.

Recording media having a selectively laser-textured surface and methods for their production are described in U.S. Pat. Nos. 5,062,021, and 5,108,781, respectively. A laser system for texturing a substrate, Ni—P layer, or a magnetic recording layer is also disclosed.

Discrete track media, however, suffer from their own disadvantages. The surface patterns of discrete track media have generally been imposed using standard lithographic techniques to remove material from the magnetic recording layer or by creating recessed zones or valleys in the substrate prior to deposition of the magnetic material. In the former case, the magnetic recording material is etched or ion milled through a resist mask to leave a system of valleys which are void of magnetic material. In the latter case, the magnetic film, subsequently applied, is spaced far enough away from the recording head that the flux from the head does not sufficiently "write" the magnetic medium. Servo track information can be conveyed by the difference in magnetic flux at the boundary between the elevatored patterns and the valleys. However, the boundary signals have at most 50% of the amplitude of conventionally recorded data. Additionally, fabrication of production quantities of discrete track media has remained problematic, due in part to the expense of the required lithographic processes.

A narrower track width corresponds to a higher areal density. The photo patterning of media helps separate tracks and also helps increase the areal density. However, the track width produced by photo patterning is greatly limited and does not achieve the desired narrow widths.

There is ever growing need for high areal densities. Sensor dimensions are reduced to read and writer small dimension tracks. In addition to the sensor, the magnetic media also plays a key role in enhancing areal densities.

For these reasons, it would be desirable to provide an improved method for producing a discrete track patterned media. It would be particularly desirable if such a method provided the accuracy and reproducibility of lithography, but did not involve multiple process steps or the complex, dedicated tooling required for stamping. It would be best if such a method enhanced the improvements to the magnetic recording characteristics available using the conventional underlayers, magnetic recording layers, and overlayers of high density magnetic recording media.

SUMMARY OF THE INVENTION

The present invention is related to a method of fabricating a media for magnetic recording media. A base layer is provided onto which a magnetic film is deposited from a first magnetic sputtering target. A non-magnetic film is then deposited on top of the base-layer from a second sputtering target. The magnetic layer and non-magnetic layer are repeatedly deposited a predetermined number of times to produce a media source.

In a further aspect of the present invention, the base layer comprises a cylindrical rod, such that the alternating magnetic and non-magnetic layers form radially around the rod. If the layers are deposited simultaneously, the layers can form a spiral extending outwardly from the center of the rod. Alternatively, the layers can form concentric circles around the rod.

In yet a further aspect of the present invention, if the base layer is a rod, the resulting media layers can be sliced to form recording media discs. Alternatively, the rod can be used to stamp the discrete pattern onto other discs.

BRIEF DESCRIPTION OF THE DRAWINGS

The foregoing and other features of the present invention will be more readily apparent from the following detailed description and drawings of the illustrative embodiments of the invention wherein like reference numbers refer to similar elements throughout the views and in which.

DETAILED DESCRIPTION OF ILLUSTRATIVE EMBODIMENTS

The present invention relates generally to magnetic recording media, and more particularly to magnetic media formed where the tracks are created by film deposition and width of each tracks is controlled by the film deposition parameters.

By way of overview, the present invention provides a new media for which the track-width (i.e., KTPI) is defined by the thickness of a sputter deposition/plating film. Film thickness can be controlled down to few angstroms. Therefore, the tracks can be controlled and produced having dimensions of similar size. Furthermore, the grain size of tracks produced in accordance with this invention will be well defined and small since narrow tracks require deposition of thin films. Such media will also enable high linear density. Narrow tracks also provide well defined grains in the down track direction by depositing magnetic films in a texture of a granular matrix. The present invention can produce discreet track media using magnetic layers that have different anisotropy fields ("Hk") and exchange, and can include non-magnetic layers (e.g., metal or insulators).

Figure 1:
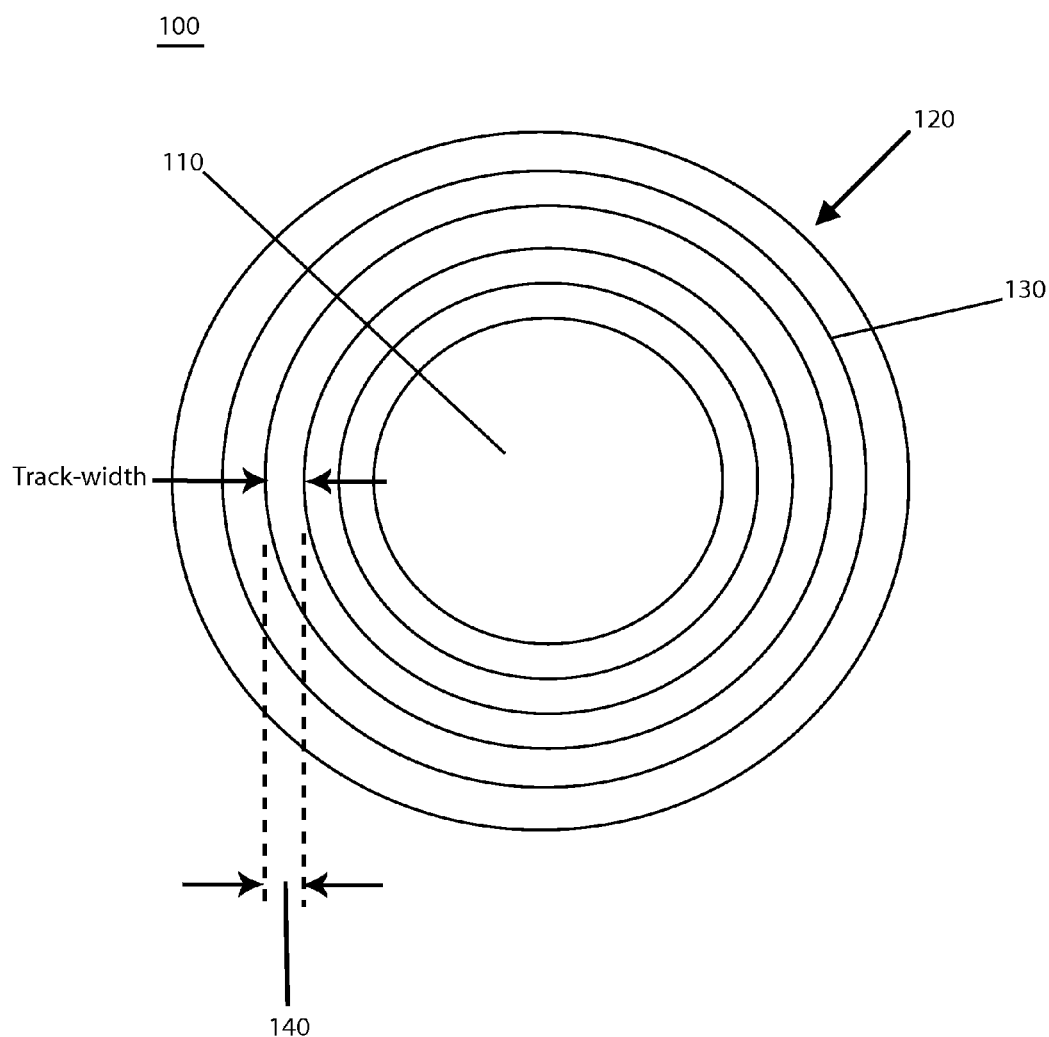
FIG. 1 illustrates a top view of a disk made in accordance with an embodiment of the present invention.

With reference to FIG. 1, an exemplary disk 100 is illustrated. Disk 100 can include an open or hollow center 110 which is surrounded by multiple magnetic layers 120 and non-magnetic layers 130. Preferably, the magnetic layer 120 has a track width 140 of about 2 nm. The magnetic layer can be made of materials known in the art for such purposes (e.g., CoPt).

The non-magnetic film can be an insulator or metallic. Further, the process used to deposit the non-magnetic film can be aqueous, for example by plating with a non-magnetic metallic layer. The non-magnetic layer 130 preferably has a width of 2 nm and is made of alumina.

Figure 2:
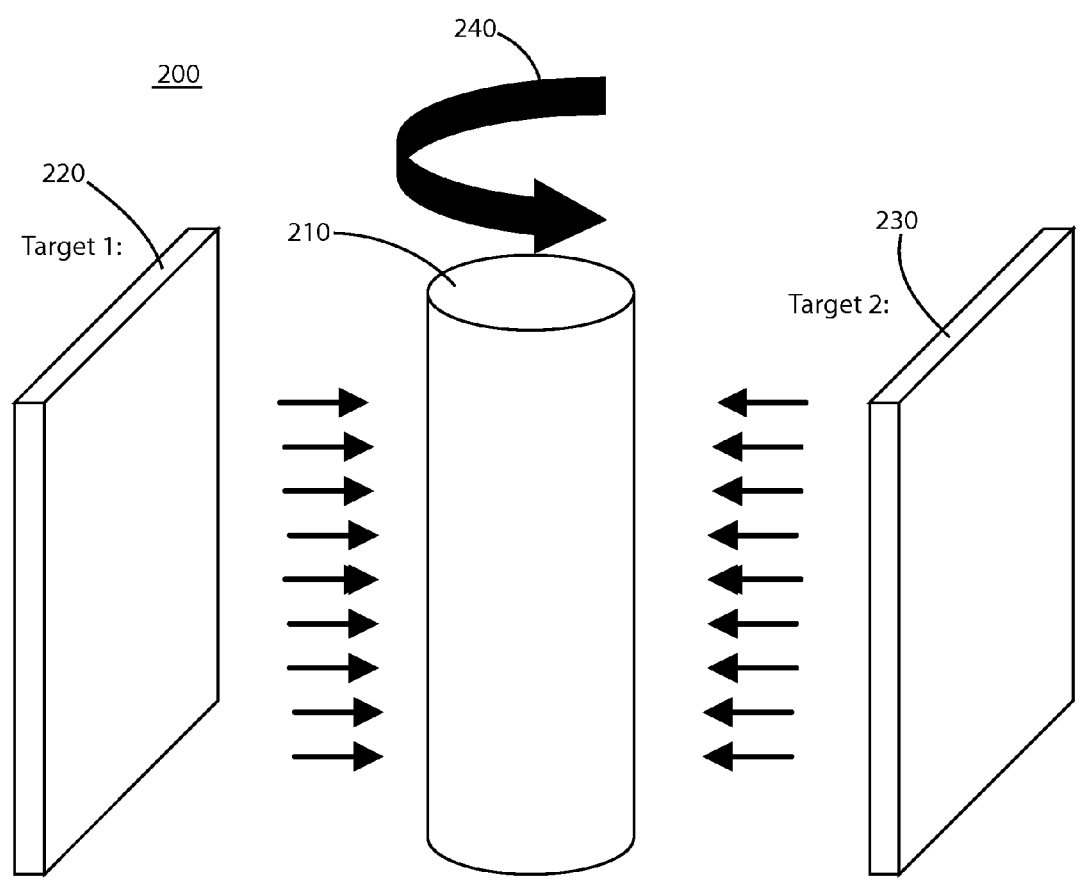
FIG. 2 illustrates the process by which a disk is made in accordance with an embodiment of the present invention.

FIG. 2 illustrates a process 200 by which disk 100 can be created. A cylindrical rod 210 made of a suitable material can be rotated about its axis in direction 240. Two deposition targets are placed perpendicular to the rotational axis. The first target 220 deposits a magnetic layer, such as CoPt, on the rod 210 as it rotates about axis 240. The second target 230 deposits an insulating, non-magnetic layer, such as alumina, on the rod 210. The deposit parameters are preferable adjusted such that each target deposits a thin layer (e.g., 2 nm) of film on the rod 210 in a single revolution of the rod 210. The films that result from this configuration spiral outwardly from the rod 210. However, if repeating concentric layers of film are preferred, shutters can be used to control the exposure of the rod 210 to each target 220 and 230 such that only one of the targets is exposed during a single rotation of the rod 210. As the cylinder increases in diameter, the parameters of the deposition system can be adjusted to ensure that the thickness of the magnetic and/or non-magnetic layers is the same for each deposition layer.

Further, if it is desired that the center of the disk remain hollow, a material that can be etched selectively (e.g., Cu) can be used for the rod 210. Applying a magnetic field along the axis of the rod 210 can result in perpendicular anisotropy of the film layers deposited on the rod 210.

Figure 3:
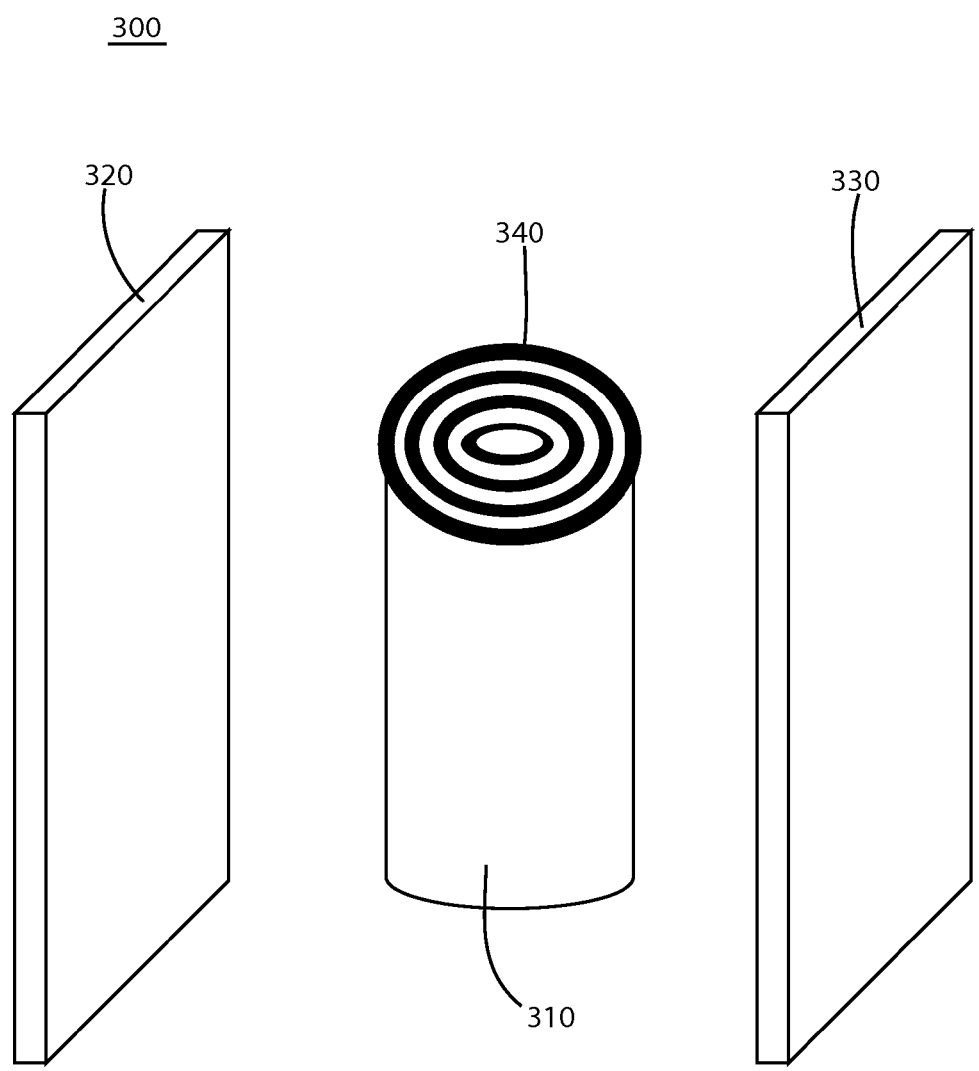
FIG. 3 illustrates a media rod during the formation process made in accordance with an embodiment of the present invention.

Once the rod 210 completely a predetermined number of rotations, a layered structure "Media Rod" 310 is produced by the depositions of magnetic layer(s) from target 320 and depositions of non-magnetic layer(s) from target 330, as illustrated in FIG. 3. The media rod 310 has concentric (or spiral) layers of magnetic media separated by non-magnetic spacers. The top (or bottom) surface 340 of the media rod 310 exposes the concentric layers of deposited film.

Figure 4:
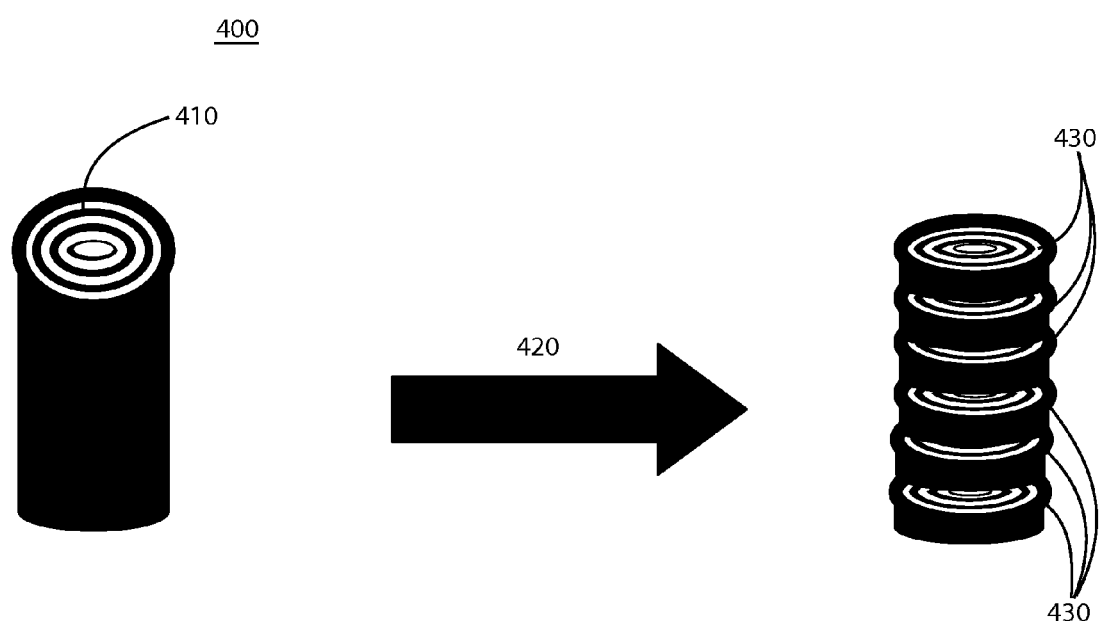
FIG. 4 illustrates a process by which the media rod is converted into disks in accordance with an embodiment of the present invention.

Once the media rod is produced, it can be used to create individual media disks. FIG. 4 illustrates one use of the media rod 410 to create media disks 430. The media rod 410 can be cut (i.e., sliced) 420 into multiple individual disks 430. The central Copper (Cu) can be etched into the disks 430 selectively, if necessary. The thickness of the magnetic film defines track-width in this particular method. Optionally, the individual disks 430 can be placed on a support disk. Further, a highly permeable material can be deposited on the substrate of the disk 430 to create a soft underlayer (SUL). The final disk 430 can be polished to smooth its surface.

Because a disk made by slicing the media rod 410 is thicker compare to deposited magnetic films (track-widths), the anisotropy direction is preferably perpendicular to disk surface.

Figure 5:
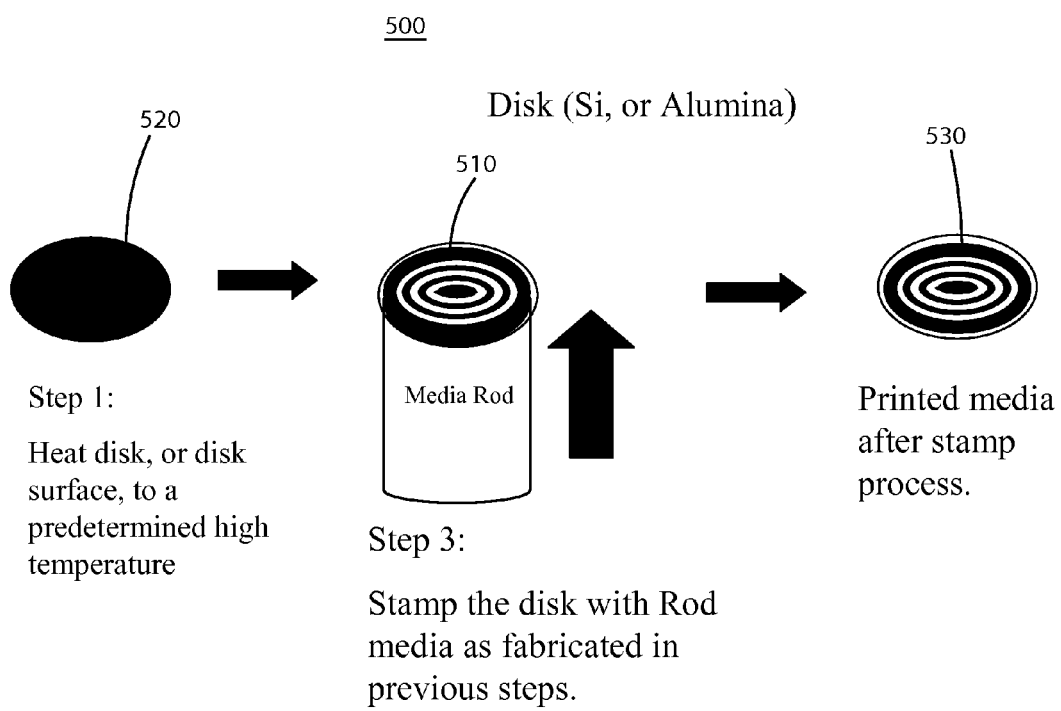
FIG. 5 illustrates a process by which the media rod is used to create disks in accordance with an embodiment of the present invention.

Alternatively, once the media rod 510 is produced, it can be used to imprint circular tracks on a disk. For example, as illustrated in FIG. 5, a disk 520, preferably made of Silicon ("Si") or an appropriate metal, can be heated to a predetermined temperature. The media rod 510 can then be used to stamp the heated disk 520 to imprint the concentric (or spiral) tracks on the media rod 510 onto the printed media disk 530.

Figure 6:
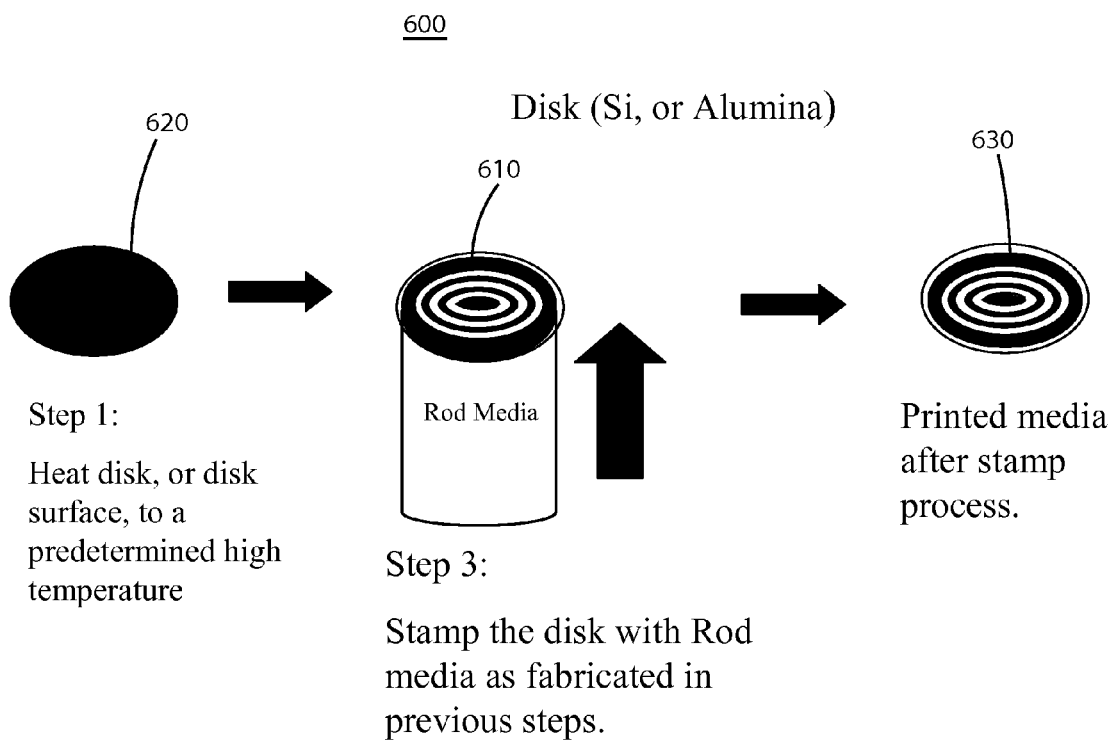
FIG. 6 illustrates a profess by which the media rod is used to create disks in accordance with another embodiment of the present invention.

In a further alternative, as illustrated in FIG. 6, the surface of the media rod 610 can be heated to a predetermined temperature such that when stamped onto a transfer disk 620, the top surface of the media rod 620 is transferred to the printed media disk 630. The media rod 620 can be heated with external agent (e.g., a laser) preferably to a temperature that liquefies the top surface. Optionally, the surface of the printed media disk 630 can be polished for smoothness.

Figure 7:
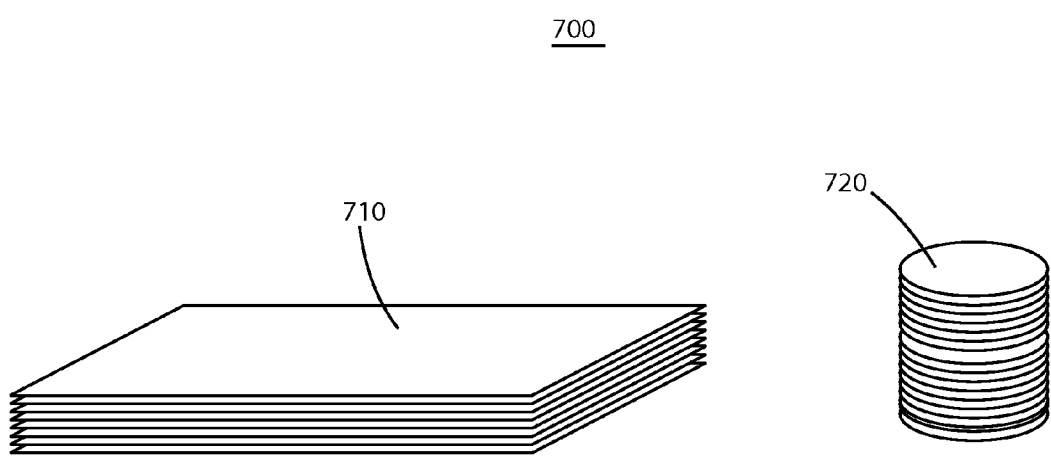
FIG. 7 illustrates a further media source in accordance with an embodiment of the present invention.

In accordance with yet a further aspect of the present invention, a cylindrical drive 720 can be produced from the alternating deposition of magnetic and non magnetic films. As illustrated in FIG. 7, a media layer 710 is created by depositing alternating layers of magnetic and non-magnetic layers. Preferably media plates are sputter deposited to create alternating layers corresponding to the track width. Cylindrical disks can be punched or cut out of the media layer 710 to produce a cylindrical drive 720. The thickness of the magnetic layer corresponds to the track-width and the non-magnetic thickness corresponds to the spacing between the tracks.

Figure 8:
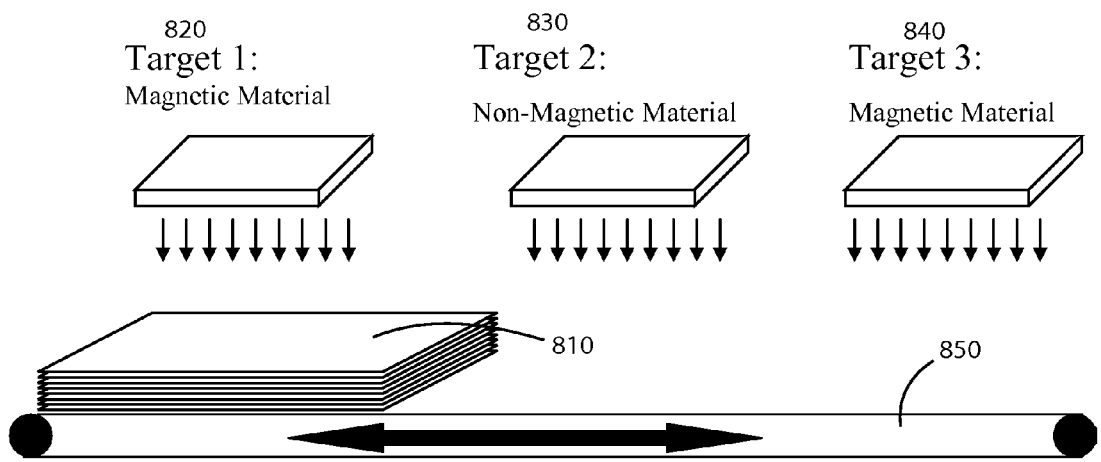
FIG. 8 illustrates a process by which a media source is made in accordance with an embodiment of the present invention.

The media layer 810 can be produced using process 800 illustrated in FIG. 8. A conveyor-belt 850, or similar mechanism, can transport a media layer 810 through the manufacturing process. Multiple deposition targets are positioned relative to the conveyor belt such that a thin film will be deposited on the media layer 810 as it comes within proximity to the deposition target.

For example, conveyor-belt 850 can oscillate media layer 810 back and forth such that deposition target 820 sputter deposits a magnetic layer, deposition target 830 sputter deposits a non-magnetic layer, and deposition target 840 sputter deposits another magnetic layer. The convey-belt can then reverse directions such that deposition target 830 deposits a further non-magnetic layer, and deposition target 820 deposits a further magnetic layer. This process can be repeated until the desired number of magnetic layers have been deposited on the media layer 810. The media layer 810 can then be cut into cylinders as described above, thereby producing cylindrical storage devices.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a magnetic data storage device, it will be appreciated by those skilled in the art that the teachings of the present invention can be applied to optical devices without departing from the scope and spirit of the present invention. The implementations described above and other implementations are within the scope of the following claims

We claim:

1. A method of fabricating a magnetic recording structure having a plurality of tracks, each track having a width, comprising:
   depositing, on a cylindrical base, a first layer having a first thickness, the first layer comprising one of a magnetic layer from a first target and a non-magnetic layer from a second target;
   depositing, on the first layer, a second layer having a second thickness, the second layer comprising the other of the magnetic layer from the first target and the non-magnetic layer from the second target;
   repeating depositing of the first and second layers a predetermined number of times to produce a plurality of magnetic layers and a plurality of non-magnetic layers interposed between the plurality of magnetic layers on the cylindrical base to provide a layered source from which the magnetic recording structure can be formed;
   heating an end surface of the layered source to a predetermined temperature; and transferring the heated end surface of the layered source to a base disk by stamping the heated end surface onto the base disk to produce the magnetic recording structure;
   wherein the magnetic recording structure includes the base disk having a plurality of concentric magnetic layers and a plurality of concentric non-magnetic layers interposed between the plurality of the concentric magnetic layers stamped thereon, wherein the thickness of each of the plurality of magnetic layers on the cylindrical base corresponds to the track width of the magnetic recording structure.

2. The method of claim 1 further comprising rotating the cylindrical base while depositing the first layer and depositing the second layer.

3. The method of claim 1 wherein the magnetic layers and the non-magnetic layers spiral outwardly from the cylindrical base.

4. The method of claim 1 further comprising selectively opening and closing at least one shutter configured to obstruct at least one of the deposition of the first layer and the deposition of the second layer so as to form a plurality of alternating concentric magnetic layers and non-magnetic layers.

5. The method of claim 1, further comprising applying a magnetic field along the axis of the cylindrical base so as to impart a perpendicular anisotropy to the magnetic layers.

6. The method of claim 1, wherein the deposition of the magnetic layer includes depositing parameters, the method further comprising adjusting the depositing parameters such that each deposited magnetic layer includes a configurable thickness.

7. The method of claim 1, further comprising polishing a surface of the magnetic recording structure.

8. A method of fabricating a cylindrical magnetic recording layered structure having a plurality of tracks, each track having a width, comprising:
   depositing, on a substantially planar base, a first layer having a first thickness, the first layer comprising one of a magnetic layer from a first target and a non-magnetic layer from a second target;
   depositing, on the first layer, a second layer having a second thickness, the second layer comprising the other of the magnetic layer from the first target and the non-magnetic layer from the second target;
   repeating depositing of the first and second layers a predetermined number of times to produce a plurality of substantially planar magnetic layers and a plurality of substantially planar non-magnetic layers interposed between the plurality of the substantially planar magnetic layers to provide a layered source; and
   cutting a cylinder from the layered source by cutting the outermost layer produced from the plurality of substantially planar non-magnetic layers interposed between the plurality of substantially planar magnetic layers down through the planar base to form the cylindrical magnetic recording layered structure;
   wherein the thickness of each of the plurality of magnetic layers deposited on the planar base corresponds to the track width of the cylindrical magnetic recording layered structure.

* * * * *